2,987,147
AUTOMATIC TRAILER BRAKE
Cecil C. Mitchell, 4254 Blair St., St. Louis, Mo., and Gary P. Sprenger, 119 Stoneyside, Clayton, Mo.
Filed Mar. 18, 1959, Ser. No. 800,218
4 Claims. (Cl. 188—140)

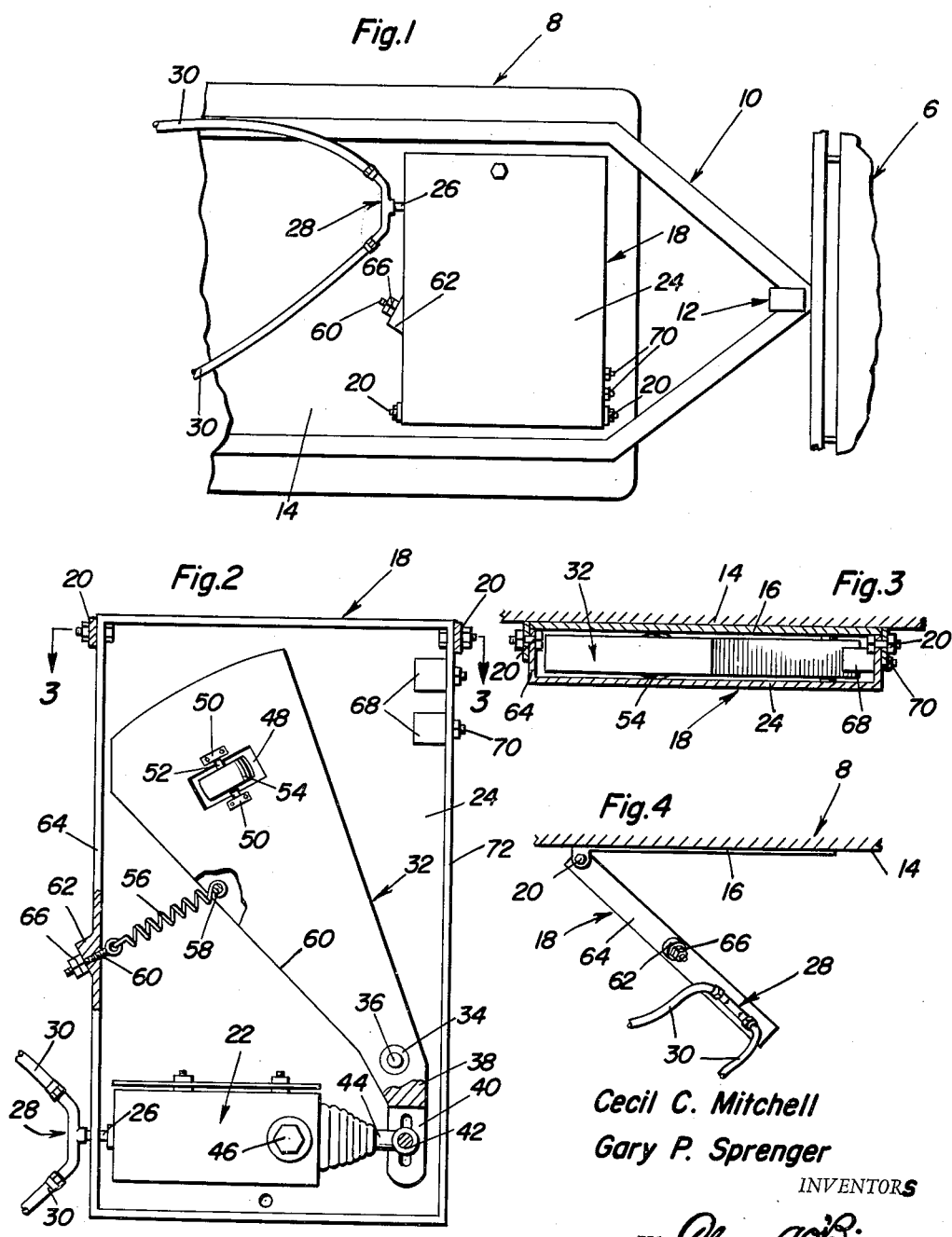
June 6, 1961   C. C. MITCHELL ET AL   2,987,147
AUTOMATIC TRAILER BRAKE
Filed March 18, 1959
Cecil C. Mitchell
Gary P. Sprenger
INVENTORS United States Patent Office 2,987,147
Patented June 6, 1961

The present invention relates to certain new and useful improvements in a so-called automatic or self-applied trailer brake which is especially, although not necessarily, designed and adaptable to practical use on rental trailers.

It is a matter of common knowledge that others working in the field of endeavor under consideration here have found it advisable to equip a trailer, in a tractor-trailer combination, with momentum actuated fluid brake means. It appears, however, that many of these prior art adaptations have, evidently, not met with widespread adoption and use because, for the most part, the brake applying and releasing means is incorporated in one manner or another with the hitch means between the respective vehicles. Therefore, it is to be pointed out at the outset that there is no direct connection from the tractor or towing vehicle to the trailer. Stated otherwise the invention is mounted on the trailer body and is independent of the usual tractor-trailer hitch. With the instant improved arrangement and construction there will be no need to install special brake connections between the two vehicles and consequently this will result in a saving of time, material and expense.

It follows that in carrying out the principles of the instant concept the trailer brake means may be constructed as a self-contained ready-to-install device. It is characterized by a simple openable and closable case or casing, may be mounted accessibly on the underneath side or bottom of the trailer body making it possible to readily adapt the brake fluid lines for connecting with the wheel cylinders of suitably constructed brake-equipped wheels.

In carrying out the invention a simple elongated case or box-like housing is utilized. This case has a receptacle portion and a flat cover plate. The cover plate is hingedly connected at one end to the corresponding end of the receptacle portion. The cover plate is fixed on the bottom of the trailer body and the receptacle portion may be swung in an arc toward and from said plate permitting access to be had to the interior space of the receptacle portion. The receptacle portion preferably has a flat bottom and the master cylinder is confined in the receptacle portion and fixed to the bottom and has a fill-plug which is accessible when the case is open. An adjustable spring-biased wedge-shape weight is provided. This weight is pendulum-like and is confined for operation in the receptacle portion and has one end operatively connected with the plunger rod on the master cylinder. The brake fluid lines are connected to the other end of the master cylinder.

The pendulum-like weight, which functions as a brake applying and releasing lever, is normally inert and is controlled by momentum received from the towing vehicle or tractor. As explained, the lever has a pendulous motion when in operation and the smaller end thereof is pivotally mounted on the bottom wall of the receptacle portion and projects beyond the pivot and is operatively connected with the plunger of the master cylinder. A coil spring is connected at one end to the median edge portion of the weight and has its other end adjustably connected to an adjacent wall of the receptacle portion.

Other objects, features and advantages will become more readily apparent from the following description and the accompanying drawing.

In the drawing:

FIG. 1 is a bottom plan view showing a fragmentary portion of the trailer and also the tractor or towing vehicle and showing the improved automatic brake and how it is mounted on the bottom of the trailer body.

FIG. 2 is a plan view on a larger scale showing the receptacle portion of the case with parts in section and elevation and covering the principal details employed in the improved construction.

FIG. 3 is a section on the line 3—3 of FIG. 2 looking in the direction of the arrows.

FIG. 4 is a view on a smaller scale observing the line-equipped side and showing the receptacle portion hinged and swung down to open position.

In FIG. 1 the numeral 6 designates the towing vehicle, tractor or the like while the trailer or towed vehicle is denoted at 8, the latter having frame means 10 embodying a coupling or suitable hitch construction 12. The bottom of the trailer is denoted at 14. As seen in FIGS. 3 and 4 the flat rectangular cover plate 16 of the case or housing is appropriately mounted on the bottom 14. The rectangular pan-like receptacle portion 18 has one end portion 20 hingedly suspended from the corresponding end of the cover plate. As brought out in FIG. 4 this arrangement allows the open side of the receptacle portion to be swung down to permit access to be had to the interior of the receptacle portion.

The master brake cylinder 22 is fixedly confined in one end of the receptacle portion and attached to the bottom thereof 24 in any suitable manner (not detailed). The discharge end of the cylinder is provided with a flexible connection 26 communicatively joined with three-way union 28 to which the brake fluid delivering lines 30 are connected. The other ends of the lines are connected in a suitable manner to wheel cylinders on the brake equipped wheels of the trailer (not shown).

The momentum actuated weighted lever (or pendulum, as it is sometimes called) is denoted by the numeral 32. It is a wedge-shaped weight, as evident in FIG. 2, which has an opening at its narrower end provided with a bushing 34 pivotally mounted on a fixed pivot pin 36. The reduced extension 38 is bifurcated and the furcations 40 are appropriately connected at 42 to the plunger rod 44. The numeral 46 designates a filler plug which is rendered accessible when the receptacle portion is open as seen in FIG. 4. Adjacent the larger or wider end of the weight is provided with a suitable opening 48 having oppositely positioned bearings 50 for journals 52 provided on the friction roller 54. The roller is operable in the opening 48 and as seen in FIG. 3 it is of a diameter greater than the thickness of the weight so that its top and bottom portions have rolling contact with the interior surfaces of the cover 16 and bottom wall 24 in an obvious manner. The automatic return spring comprises a simple coil spring 56 appropriately connected at 58 to a median part of the edge 60 of the weight. The opposite end of the spring is connected to an adjusting bolt 60 operable through a passage in the lug 62 on the wall 64, said bolt having adjusting nuts 66.

To assist in properly checking the movement of the lever 32 in a forward direction appropriate resilient bumper blocks 68 are provided, these being appropriately fastened in place on the wall 72 of the receptacle portion.

The self-applied trailer brake, which we frequently refer to as a pendulum type self-applied brake, has been constructed and experimentally used. Current tests show that braking is usually not needed on the trailer for normal stops ranging say from zero to fifteen miles per hour. Therefore, the spring 56 may be adjusted to hold the weight motionless on these "normal" stops. However, if a fast stop is necessary and full brakes are applied on the towing vehicle, the weight 32 then overrides the zero spring setting and gives for full trailer brake application also.

In practice when the brakes on the towing vehicle 6 are applied, the pendulum brake 32 operates generally as follows: The decrease which is present in the trailer becomes equal in momentum to that of the tractor 6. However, the weight being free to move continues its forward motion around its pivot point and applies pressure on the master cylinder plunger thereby causing pressure to be applied to wheel brake cylinders by way of the fluid lines 30. When the brakes on the towing vehicle 6 are released and forward acceleration is resumed the weight 32 moves back under the influence of spring means to brake releasing position. Motion of the weight can be controlled by adjustment of the spring tension and the adjustment can be made to start the trailer brake working at various miles per hour. The weight moves forward in direct proportion to the brake applications on the towing vehicle. If the brakes on the vehicle 6 are applied hard enough to slide its wheels the trailer brakes (not detailed) are also applied sufficiently hard to slide the wheels thereon. Experience has shown that if the trailer hitch means 12 should become disengaged during towing, the trailer tongue (not shown) striking the ground causes a loss of momentum which results in application of the trailer brakes bringing the trailer to complete rest.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on a trailer; automatically operable brake applying and releasing means adapted to be mounted on the trailer body and independent of the usual trailer-tractor-hitch comprising an elongated case having a receptacle portion and a flat cover plate hingedly connected at one end to a corresponding end of the receptacle portion, said cover plate adapted to be fixed to the bottom of the trailer body and said receptacle portion being swingable in an arc toward and from the cover plate to permit access to be had to the space of the receptacle portion, the latter having a flat bottom, a master cylinder fixed to said bottom and having a fill-plug, an adjustable spring biased wedge-shaped weight confined for operation in the receptacle portion and having one end operatively connected with said master cylinder, brake fluid lines, and means communicatively connecting said fluids lines to said master cylinder.

2. For use on a trailer; automatically operable brake applying and releasing means adapted to be mounted on the trailer body and independent of the usual trailer-tractor-hitch a self-contained attachment embodying an elongated case having a receptacle portion and a flat cover plate hingedly connected at one end to a corresponding end of the receptacle portion, said cover plate adapted to be fixed to the bottom of the trailer body and said receptacle portion being swingable in an arc toward and from the cover plate to permit access to be had to the space of the receptacle portion, the latter having a flat bottom, a master cylinder mounted and confined in one end portion of the receptacle portion, a normally inert momentum actuated flat-faced weight located in said receptacle portion, said weight constituting a brake applying and releasing lever generally wedge-like in plan and having a pendulous motion when in play, the smaller end portion of said weight being pivoted in said receptacle portion and having an extension projecting beyond the pivot and operatively connected with the plunger of the master cylinder, a coil spring conencted at one end to a median edge portion of the weight and having its other end adjustably connected with an adjacent wall of the receptacle portion.

3. The structure defined in claim 2, and cushioned bumpers fixed to an opposite wall of the receptacle portion and with which an adjacent edge portion of the weight may have recoiling engagement, said weight having an opening provided with bearings, and an anti-friction roller positioned for free idling in said opening and having journals mounted for operation in said bearings, said roller being of a diameter greater than the thickness of the weight so that diametrically opposite peripheral portions of the roller may have free rolling contact with interior surfaces of the receptacle bottom and said cover plate respectively.

4. For use on a trailer automatically operable brake applying and releasing means adapted to be mounted on the trailer body independent of the usual trailer-tractor-hitch comprising a readily applicable attachment embodying a master cylinder, means for attaching brake fluid delivering lines operatively with said master cylinder, said master cylinder having a plunger operating rod, supporting and enclosing means for said master cylinder mounted on the trailer body, and a weighted lever pivotally mounted between its ends on said supporting means and having operating connection at one end with said plunger rod, a coil spring connected at one end to said lever and adjustably connected at its other end to said support means, said lever comprising a wedge-shaped weight provided with flat top and bottom surfaces and provided at one end with an attached freely rotatable anti-friction roller.

References Cited in the file of this patent

UNITED STATES PATENTS

| | | |
|---|---|---|
| 2,183,283 | Sampietro | Dec. 12, 1939 |
| 2,870,876 | Pease | Jan. 27, 1959 |